United States Patent
Ye et al.

(10) Patent No.: US 12,462,342 B2
(45) Date of Patent: Nov. 4, 2025

(54) TARGET OBJECT DISPLAY METHOD, APPARATUS AND ELECTRONIC DEVICE

(71) Applicant: BEIJING BYTEDANCE NETWORK TECHNOLOGY CO., LTD., Beijing (CN)

(72) Inventors: Xinjing Ye, Beijing (CN); Ying Tan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 392 days.

(21) Appl. No.: 18/011,161

(22) PCT Filed: Jun. 18, 2021

(86) PCT No.: PCT/CN2021/101043
§ 371 (c)(1),
(2) Date: Jun. 21, 2023

(87) PCT Pub. No.: WO2021/254502
PCT Pub. Date: Dec. 23, 2021

(65) Prior Publication Data
US 2024/0242310 A1    Jul. 18, 2024

(30) Foreign Application Priority Data

Jun. 19, 2020   (CN) .................. 202010568911.X

(51) Int. Cl.
*G06T 5/50*      (2006.01)
*G06T 3/40*      (2024.01)
(Continued)

(52) U.S. Cl.
CPC .............. *G06T 5/50* (2013.01); *G06T 3/40* (2013.01); *G06T 7/10* (2017.01); *G06T 7/73* (2017.01);
(Continued)

(58) Field of Classification Search
CPC .... G06T 5/50; G06T 3/40; G06T 7/10; G06T 7/73; G06T 2207/20221;
(Continued)

(56) References Cited

U.S. PATENT DOCUMENTS

2010/0259645 A1* 10/2010 Kaplan .................. H04N 5/772
                                                               348/E5.031
2014/0267842 A1    9/2014 Lee et al.
(Continued)

FOREIGN PATENT DOCUMENTS

CN        103905716 A    7/2014
CN        105227867 A    1/2016
(Continued)

OTHER PUBLICATIONS

International Patent Application No. PCT/CN2021/101043; Int'l Written Opinion and Search Report; dated Sep. 18, 2021; 8 pages.
(Continued)

*Primary Examiner* — Devona E Faulk
*Assistant Examiner* — Donna J. Ricks
(74) *Attorney, Agent, or Firm* — BakerHostetler

(57) ABSTRACT

The present application provides a target object display method and apparatus and an electronic device, relating to the technical field of target object display. The method comprises: displaying at least two image preview areas; and for each image preview area, executing the following operations: displaying a video comprising a target object in the corresponding image preview area; and according to a trigger instruction, displaying the target object in the corresponding image preview area in a freeze-frame mode.

19 Claims, 6 Drawing Sheets

(51) Int. Cl.
  *G06T 7/10*     (2017.01)
  *G06T 7/73*     (2017.01)
  *G06V 10/25*    (2022.01)
  *G06V 40/16*    (2022.01)

(52) U.S. Cl.
  CPC ............ *G06V 10/25* (2022.01); *G06V 40/165* (2022.01); *G06T 2207/20221* (2013.01); *G06T 2207/30201* (2013.01)

(58) Field of Classification Search
  CPC .......... G06T 2207/30201; G06V 10/25; G06V 40/165; H04N 21/4312; H04N 23/632; H04N 5/2628; H04N 5/272; H04N 23/80
  See application file for complete search history.

(56) References Cited

U.S. PATENT DOCUMENTS

| | | | |
|---|---|---|---|
| 2016/0065861 A1* | 3/2016 | Steinberg | G06V 40/161 348/239 |
| 2019/0116322 A1* | 4/2019 | Holzer | G06T 7/75 |
| 2022/0101490 A1* | 3/2022 | Bruder | G06T 19/006 |

FOREIGN PATENT DOCUMENTS

| | | |
|---|---|---|
| CN | 107493440 A | 12/2017 |
| CN | 107995429 A | 5/2018 |
| CN | 110049378 A | 7/2019 |
| CN | 110058685 A | 7/2019 |
| CN | 110225241 A | 9/2019 |
| CN | 110611732 A | 12/2019 |
| CN | 111669502 A | 9/2020 |
| JP | 2007-173888 A | 7/2007 |
| KR | 10-0665037 B1 | 1/2007 |
| KR | 2014-0067511 A | 6/2014 |
| KR | 2015-0012887 A | 2/2015 |
| KR | 2018-0128878 A | 12/2018 |

OTHER PUBLICATIONS

"Tik Tok How to Shoot Different Expression Video on Four Interfaces"; https://jingyan.baidu.com/article/3052f5a12d72a097131186c7.html; Baidu; © 2023; accessed Feb. 14, 2023; 10 pages (*English Translation*).

* cited by examiner for the corresponding image preview area, for each video frame image in the video, performing portrait segmentation on the video frame image, so as to extract a portrait area in the video frame image — S210 displaying the portrait area in each video frame image in the video in the corresponding image preview area — S220

TARGET OBJECT DISPLAY METHOD, APPARATUS AND ELECTRONIC DEVICE

CROSS-REFERENCE TO RELATED APPLICATION

This application is a U.S. National Stage under 35 U.S.C. § 371 of International Application No. PCT/CN2021/101043, as filed on Jun. 18, 2021, which claims the priority right of Chinese Patent Application No. CN 202010568911.X filed in State Intellectual Property Office of the People's Republic of China on Jun. 19, 2020. The disclosure of each of these applications is hereby incorporated by reference in its entirety.

FIELD OF THE INVENTION

The disclosure relates to the technical field of target object display, and particularly to a target object display method, apparatus and electronic device.

BACKGROUND

With continuous development and progress of society, electronic products have been widely used in people's lives. Especially, in recent years, these electronic products are not only popularized rapidly, but also updated at an alarming rate. Softwares which are designed based on electronic device has also been developed rapidly, and more and more users begin to use electronic devices such as smart phones to conduct network operations such as social networking. In the process of network operation, more and more people want their own shot or recorded videos to have unique stylized characteristics.

At present, the camera of electronic device is positioned fixedly, and the whole interactive interface serves as an image preview area. When a user performs a continuous shooting, it is likely to have repeated or approximate photos in many photos, which requires the user to change his/her actions or expressions greatly, resulting in poor shooting experience.

DISCLOSURE OF THE INVENTION

This section of the invention is provided in a brief form so as to introduce the concept idea, which will be described in detail in the following detailed description section. This section is not intended to identify key features or essential features of the claimed technical solutions, nor intended to limit the scopes of the claimed technical solutions.

In a first aspect, there is provided a target object display method, which includes:
displaying at least two image preview areas;
for each image preview area in turn, displaying a video including a target object in the corresponding image preview area, and pausing display the target object in the corresponding image preview area according to a trigger instruction.

In a second aspect, there is provided a target object display apparatus, which includes:
a first display module configured to display at least two image preview areas;
a second display module, configured to, for each image preview area, display a video including a target object in the corresponding image preview area, and freeze-framed displaying the target object in the corresponding image preview area according to a trigger instruction.

In a third aspect, there is provided an electronic device, comprising:
one or more processors;
memory;
one or more programs stored in the memory and configured to be executed by one or more processors, the one or more programs configured to execute the target object display method according to the first aspect of the present disclosure.

In a fourth aspect, there provides a non-transitory computer readable storage medium having computer programs is stored, the computer programs, when executed by a processor, implement the target object display method according to the first aspect of the present disclosure.

Additional aspects and advantages of the disclosure will be set forth in part in the following description, and these will be obvious from the following description, or may be learned from practice of the disclosure.

DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic, and the components and elements are not necessarily drawn to scale.

DETAILED DESCRIPTION OF PREFERRED EMBODIMENTS

Figure 1:
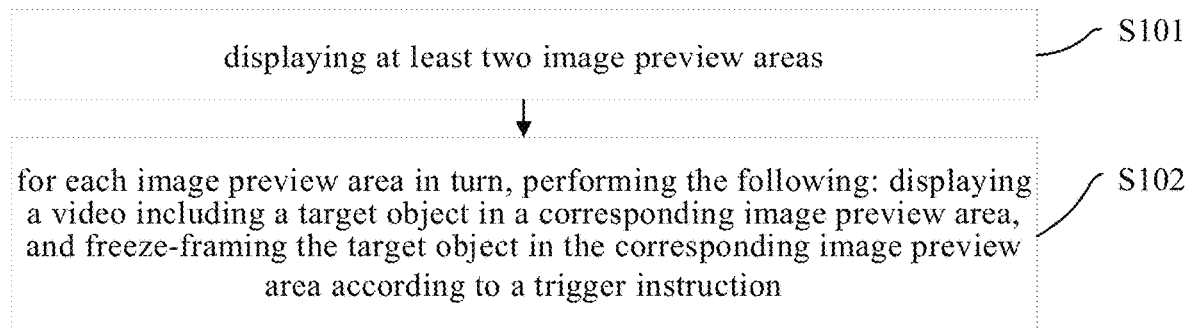
FIG. 1 is a schematic flowchart of a target object display method according to an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as limited to the embodiments set forth here. On the contrary, these embodiments are provided for a more thorough and complete understanding of the present disclosure. It should be understood that the drawings and embodiments of this disclosure are only for illustrative purposes, and are not intended to limit the scope of protection of this disclosure.

It should be understood that the steps described in the method embodiments of the present disclosure can be performed in different order and/or in parallel. In addition, the method embodiments may include additional steps and/or omit the steps shown. The scope of the present disclosure is not limited in this respect.

As used herein, the term "including" and its variations are open including, that is, "including but not limited to". The term "based on" means "based at least in part". The term "one embodiment" means "at least one embodiment"; The term "another embodiment" means "at least one other embodiment"; The term "some embodiments" means "at least some embodiments". Relevant definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "one" and "multiple" mentioned in this disclosure are illustrative rather than restrictive, and those skilled in the art should understand that unless the context clearly indicates otherwise, they should be interpreted as "one or more".

The names of messages or information exchanged between multiple devices in this embodiment are only for illustrative purposes, and are not intended to limit the scope of these messages or information.

The target object display method, apparatus, electronic device and computer readable medium according to the present disclosure are intended to solve the above technical problems of the prior art.

The technical solutions of the present disclosure and how the technical solutions of the present disclosure solve the above technical problems will be explained in detail with specific embodiments below. The following specific embodiments can be combined with each other, and the same or similar concepts or processes may not be described in detail in some embodiments. Embodiments of the present disclosure will be described with reference to the drawings below.

An embodiment of the present application provides a target object display method, which is applicable to a terminal for displaying the target object. As shown in FIG. 1, the method can include:

S101, displaying at least two image preview areas;

S102, for each image preview area in turn, performing the following: displaying a video including a target object in a corresponding image preview area, and freeze-framed displaying the target object in the corresponding image preview area according to a trigger instruction.

Figure 2:
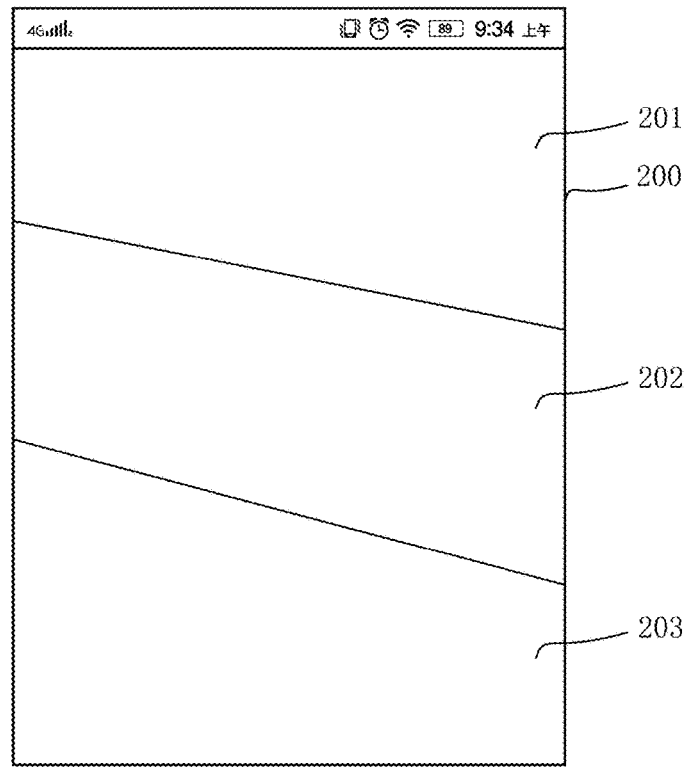
FIG. 2 is a schematic diagram of an interactive interface provided in an example of the present disclosure.

Among them, the image preview areas are arranged on an interactive interface for displaying videos. As shown in FIG. 2, the interactive interface 200 can be provided with multiple image preview areas, for example, an image preview area 201, an image preview area 202 and an image preview area 203; target objects can include portraits, and can also include other objects, animal images, etc., and the video can include one or more target objects; for the sake of conciseness, the present disclosure is mainly explained in detail by taking a target object which includes a portrait as an example. In an image preview area, a video including a target object is displayed, and then the target object is freeze-framed displayed in the corresponding image preview area according to a trigger instruction, thereafter, the video is displayed in another image preview area, and the target object is freeze-framed displayed in the another image preview area. That is, each image preview area can display the video including the target object, and after the freeze-framed displaying is performed in one image preview area according to the trigger instruction, the video including the target object can be displayed in another image preview area and then freeze-framed displayed according to the trigger instruction.

Specifically, the trigger instruction can be generated in various ways. The trigger instruction can be generated according to preset actions of the target object being detected in the video, for example, when the target object is a portrait, the trigger instruction can be generated according to smile, hand heart or various gestures being detected in the video; the trigger instruction can also be generated by the user directly triggering a trigger control on the interactive interface in the manner of clicking, touching, or sliding, etc.; the trigger instruction can also be generated by reeiving the user's voice, and detecting the voice contains a preset trigger instruction, such as "start shooting", and the specific manners of generating the trigger instruction are not so limited.

As shown in FIG. 2, the image preview areas 201, 202 and 203 can all display videos including target objects. In a specific implementation process, the processing for each image preview area in turn may be based on a preset order, for example, the interactive interfaces in FIG. 2 can be processed from top to bottom, from bottom to top, or in a random order, and the present disclosure is not so limited.

The freeze-framed displaying can be that after the trigger instruction is detected, a target object in one video frame image of a video to which the trigger instruction points is displayed in an image preview area and remains unchanged. Then, the video is displayed in another image preview area, and continues to be freeze-framed displayed in the next image preview area according to the trigger instruction, until the target object is freeze-framed displayed in any image preview area. It can be understood by those skilled in the art that, for each image preview area in turn, after the video including the target object can be displayed in one image preview area and then freeze-framed displayed according to the trigger instruction, the video including the target object can be displayed in another image preview area and freeze-framed displayed according to the trigger instruction. As shown in FIG. 2, when the trigger instruction is received, the target object in a frame of image to which the trigger instruction points is displayed in the image preview area where the target object is displayed. Specifically, for example, a frame image in the image preview area 201 corresponding to the trigger instruction is displayed in this image preview area 201, and similar operations are performed in other image preview areas 202 and 203.

It can be understood that the trigger instructions corresponding to different image preview areas can be the same, for example, they are all smile actions; and the trigger instructions corresponding to different image preview areas can also be different, for example, the trigger instructions corresponding to different image preview areas are different gestures.

In the above embodiments, by arranging at least two image preview areas on an interactive interface, displaying a video including the target object and freeze-framed displaying the target object in each image preview area in turn, the well-arranged continuously shot effects can be presented without needing the user to change his/her actions or expressions greatly, which can improve the user's photographing experience.

An embodiment of the present disclosure provides a possible implementation, in which an overlapping area is arranged between two adjacent image preview areas in at least two image preview areas.

Specifically, there is an overlapping area between two adjacent image preview areas, that is, a target object displayed in any image preview area may also be partially displayed in the adjacent image preview areas concurrently.

Figures 3, 4:
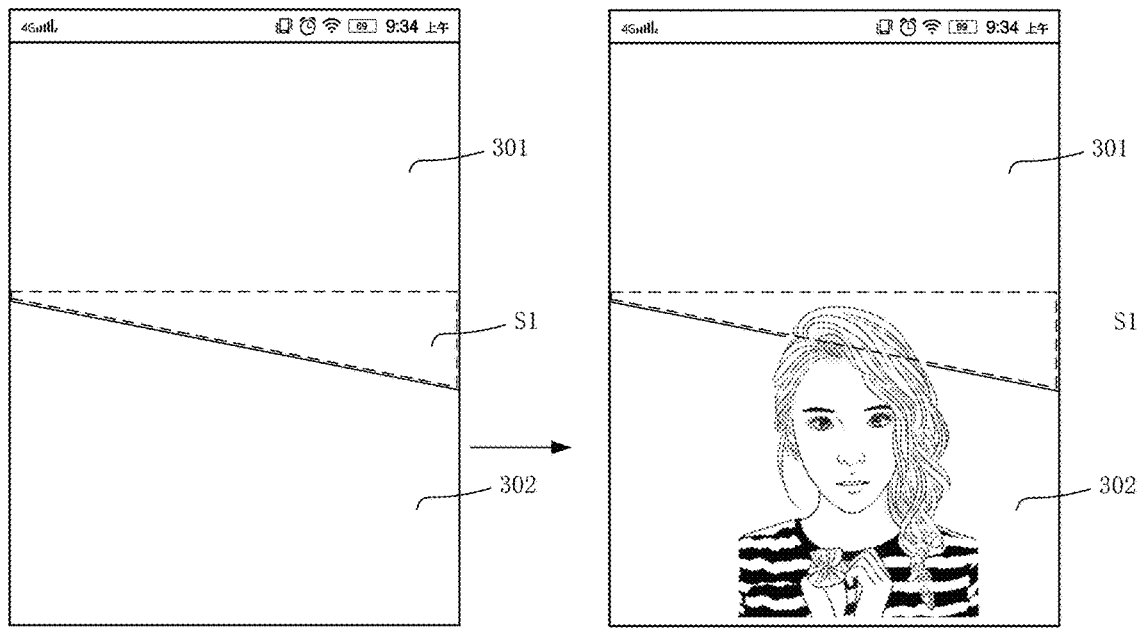
FIG. 3 is a schematic diagram that there exists an overlapping area in an image preview area in an example of the present disclosure.
FIG. 4 is a schematic flowchart of a target object display method according to the embodiment of the present disclosure.

As shown in FIG. 3, there is a range S1 of an overlapped area between the image preview area 301 and the image preview area 302 shown by dotted lines. When the target portrait appears in the image preview area 302, a part of the target portrait may be displayed in the range S1, so that the boundary between different image preview areas will not be too stiff.

An embodiment of the present disclosure provides a possible implementation, in which the target object includes a portrait; as shown in FIG. 4, the displaying a video including a target object in a corresponding image preview area in step S102 may include:

step S210, for the corresponding image preview area, for each video frame image in the video, performing portrait segmentation on the video frame image, so as to extract a portrait area in the video frame image.

Among them, the portrait area can be, in each video frame image, a contour area formed by limbs or the whole body of a person appearing in the video frame image.

The portrait segmentation refers to separating a portrait from a background in a picture, so as to divide into different areas. AI (Artificial Intelligence) can be used to realize the portrait segmentation.

S220, displaying the portrait area in each video frame image in the video in the corresponding image preview area.

Specifically, every time a frame of video frame image of a video is acquired, the portrait segmentation is performed on the frame of video frame image to obtain a portrait area in the video frame image, and the portrait area in the frame of video frame image is displayed in then image preview area; and a next video frame image of the video continues to be acquired, and the above steps of portrait segmentation and displaying are repeated.

An embodiment of the present disclosure provides a possible implementation, in which before performing the portrait segmentation on the video frame image in step S210, the following may be further included:

performing an image conversion on the video frame image to obtain the converted video frame image.

Among them, the image conversion can include style conversion of the image, such as adding filters, adjusting colors, etc.; and can also include converting the image into a corresponding cartoon, that is, converting the image into cartoon style, etc.

For example, for each video frame image, the video frame image can be input into a trained image conversion network to obtain a converted video frame image corresponding to the video frame image.

S210, performing portrait segmentation on the video frame image, so as to extract a portrait area in the video frame image, may include:

performing portrait segmentation the converted video frame image, so as to extract a portrait area in the converted video frame image.

In this embodiment, every time a video frame image is acquired, image conversion is performed on the video frame image, then portrait segmentation is performed on the video frame image after image conversion to obtain a portrait area, and the obtained portrait area is displayed in the video preview area; continue to a next frame of video frame image, and the image conversion, the portrait segmentation and the display are performed. Taking cartoon animation style conversion as an example, the edge lines of portrait area are smoother after image conversion, which can make portrait segmentation to be more detailed and natural.

In the above embodiment, for a video frame image, the image conversion is first performed and then the portrait segmentation is performed, a portrait area is extracted and displayed in a corresponding image preview area, so that the edge lines of the portrait area after image conversion are smoother, which can make the portrait segmentation more detailed and natural; and the image conversion can make the obtained portrait area have a different style from the original portrait area, which is interesting and can improve the user's experience.

In the above embodiment, the image conversion is first performed, and then the portrait segmentation is performed. In another embodiment, the video frame image can be directly converted, and the converted video frame image can be displayed in a corresponding image preview area, that is, not only the converted portrait area but also the converted background area can be displayed in the image preview area.

An embodiment of the present disclosure provides a possible implementation, in which at least one of at least two image preview areas is provided with a corresponding background image;

The displaying a video including a target object in a corresponding image preview area in step S102 may include:

The portrait area in each video frame image in the video is superimposed and displayed on the background image of the corresponding image preview area.

In one embodiment, each image preview area can be pre-configured with a corresponding background image, and for each video frame image of video, a portrait segmentation can be first performed to obtain a portrait area in the video frame image, and then the portrait area in one frame of video frame image can be superimposed and displayed on the background image of the corresponding image preview area.

In another embodiment, for each video frame image of the video, the image conversion is first performed on the video frame image and then the portrait segmentation is performed, a portrait area is extracted, and the converted portrait area in the video frame image can be superimposed and displayed on the background image of the corresponding image preview area.

Specifically, for different image preview areas, the number of target objects included in the displayed video may be the same or different. By taking an interactive interface including two image preview areas as an example, when the video is displayed in the first image preview area, the video includes a target object, and when the video is displayed in the second image preview area after the target object is freeze-framed displayed in the corresponding image preview area according to the trigger instruction, the video can include two or more target objects. At this time, the process of displaying the video including the target objects in the second image preview area and freeze-framed displaying two or more target objects is the same as the process corresponding to the first image preview area. That is to say, the numbers of target objects in different image preview areas do not affect the process of displaying videos including target objects in the image preview areas and freeze-framed displaying two or more target objects.

Specifically, when the portrait area is superimposed and displayed on the background image, the edge between the portrait area and the background image can be smoothed, which makes the superimposition between the edge of the portrait area and the background image more natural.

Figure 5:
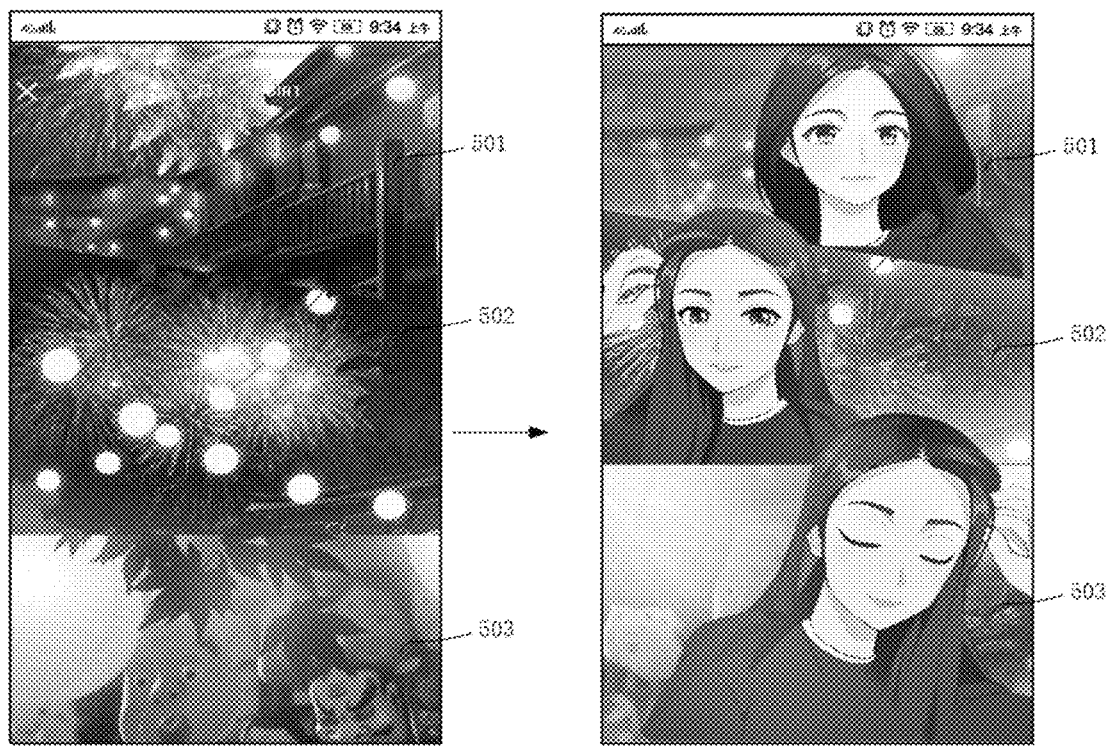
FIG. 5 is a schematic diagram of interactive interface change provided in an example of the present disclosure.

As shown in FIG. 5, the interactive interface is provided with three image preview areas 501, 502 and 503, and each image preview area is provided with a corresponding background image; portrait areas can be superimposed and displayed in the three image preview areas in sequence, and each portrait area is superimposed and displayed on the background image of the corresponding image preview area.

Specifically, the background images in different image preview areas can be the same or different; the background images in different image preview areas can be different images of the same style series or different images of different style series, and the present disclosure is not limited to this. In addition, the style of the portrait area displayed in the image preview area can be consistent with that of the background image, so that the picture is harmonious and interesting, and the user's experience is further improved.

An embodiment of the present disclosure provides a possible implementation, in which the target object display method may further include:
(1) upon detecting a background switching operation by a user for at least one image preview area, switching background images of at least one image preview area;
(2) updating and displaying at least two image preview areas, in accordance with the switched background images.

Among them, the background switching operation can be triggered based on the user clicking and sliding any position in the image preview area, can also be triggered by voice, and can also be triggered by a control on the interactive interface, which are not so limited in this disclosure.

Specifically, by means of the background switching operation, the background image of one image preview area targeted by the operation can be switched, the background images of some image preview areas can be switched, and the background images of all image preview areas can be switched.

Specifically, after background image switching, the image preview area can be updated and displayed according to the switched background, that is, position, range or layout of the image preview area in the interactive interface can be adjusted, and the number of the image preview areas can also be adjusted. Updating the image preview area on the interactive interface according to the background image can provide users with richer shooting experience.

Figure 6:
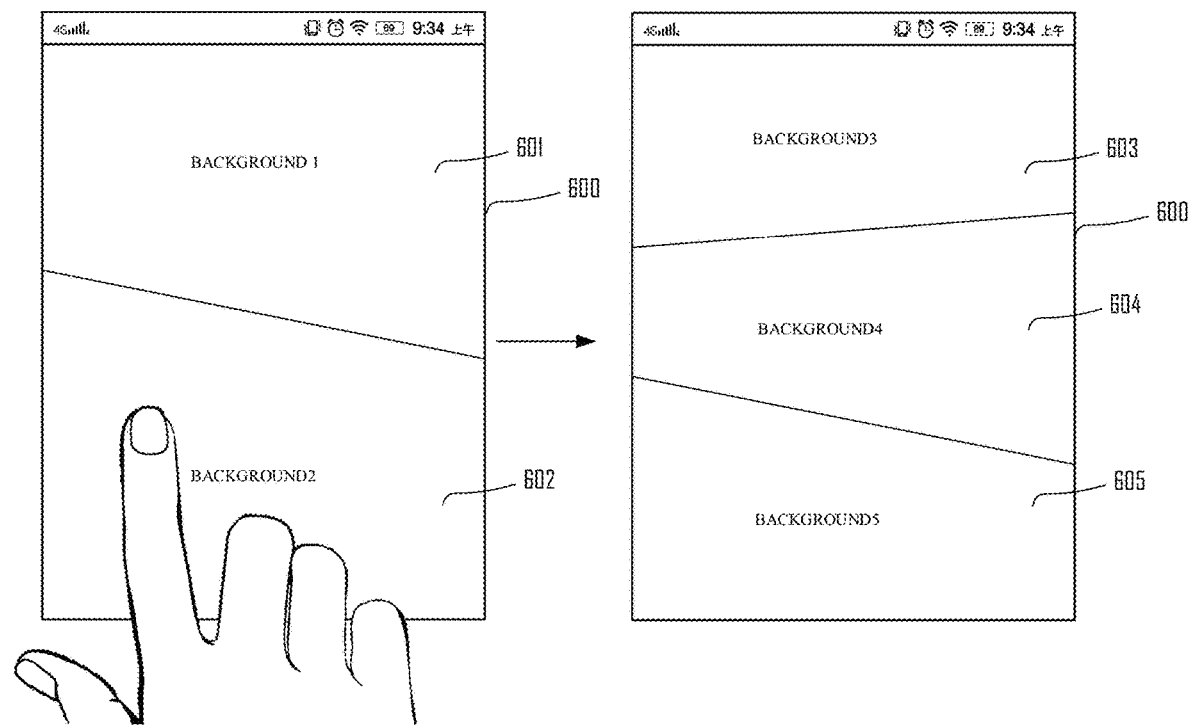
FIG. 6 is a schematic diagram of image preview area updating provided in an example of the present disclosure.

As shown in FIG. 6, an interactive interface 600 before the background switching operation is received and is provided with an image preview area 601 and an image preview area 602. After receiving the background switching operation, such as the touch or click operation shown in the figure, the image preview area 601 and the image preview area 602 on the interactive interface can be updated and displayed as an image preview area 603, an image preview area 604 and an image preview area 605.

In other embodiments, during the background image of the image preview area is switched, while the style of the background image is switched, the image conversion style of the portrait area can also be changed accordingly, so that the image style of the portrait area is compatible with the style of the background area, and the finally presented picture is more harmonious.

Before the portrait area in the video is displayed in the image preview area, the portrait area in each video frame image in the video can also be scaled, the process of scaling the portrait area in each video frame image in the video will be described below with reference to specific embodiments.

An embodiment of the present disclosure provides a possible implementation, in which the displaying the portrait area in each video frame image in the video in the corresponding image preview area in step S220 may include:
(1) scaling the portrait area in each video frame image in the video based on the first scaling ratio.

The first scaling ratio can be predefined, that is, for different image preview areas, the corresponding first scaling ratios can be different or the same; in addition, the first scaling ratio can also be determined in real time according to the picture size of the video frame image and the area size of the image preview area.

Specifically, before scaling the portrait area in each video frame image in the video based on the first scaling ratio, the method may further include:
1) determining the range area of the portrait area;
2) determining the area size of the corresponding image preview area;
3) determining the first scaling ratio based on the area size and the range area.

In an actual shooting scene, if the user takes a selfie, because the shooting distance is too short, the portrait will be taken as the foreground whose scene occupies a relatively large proportion, while the background scene will occupy a too small proportion, which does not meet the aesthetic requirement from the perspective of photography. Therefore, the portrait area in each video frame image can be scaled by using a scaling ratio which is predefined or calculated in real-time.

Figure 7:
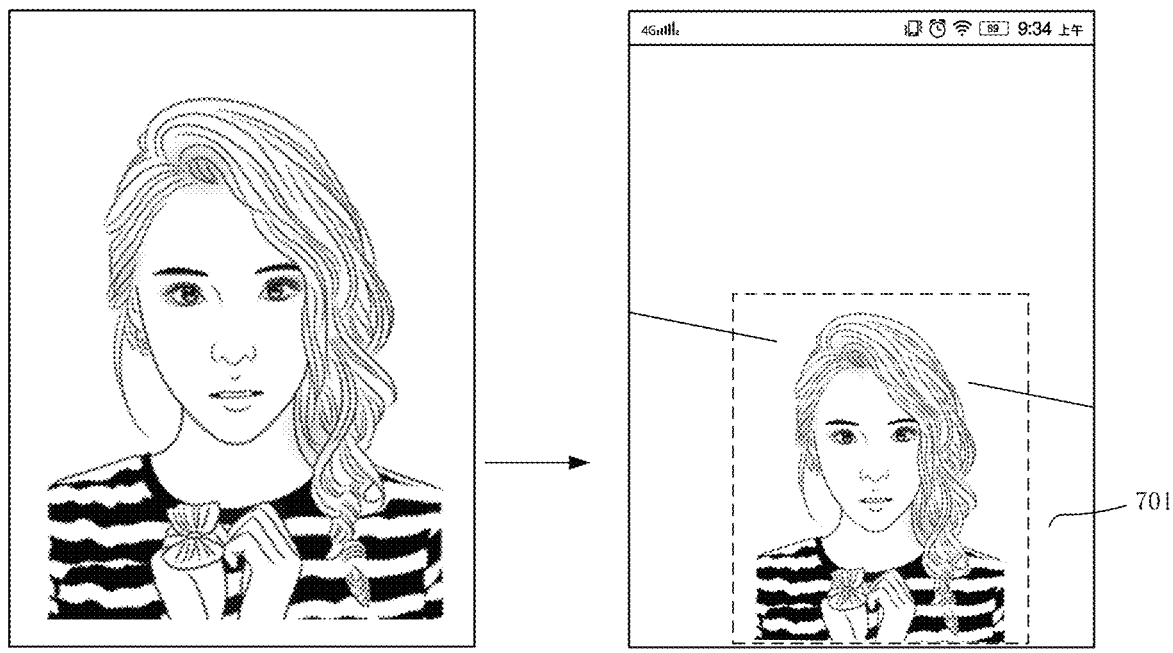
FIG. 7 is a schematic diagram of portrait area zooming provided in an example of the present disclosure.

As shown in FIG. 7, the range area of the portrait area before scaling is shown in FIG. 7. After scaling the portrait area in the video, a scaled portrait area can be obtained and displayed in the image preview area 701.

In the above embodiment, after the portrait area is acquired, the portrait area is scaled; in other embodiments, each video frame image of the video can be scaled first, and then the portrait segmentation can be performed thereon; otherwise, the image of each video frame of the video is scaled first, then the image is converted, and finally the portrait segmentation is performed, and the present disclosure is not so limited.

In the above embodiment, for each video frame image in the video, the image conversion is first performed, and then the portrait segmentation is performed. In another embodiment, the video frame image can be directly image-converted, and the converted video frame image can be displayed in a corresponding image preview area, that is, not only the converted portrait area but also the converted background area can be displayed in the image preview area.

(2) Displaying the scaled portrait area in the corresponding image preview area.

Specifically, the displaying the scaled portrait area in the corresponding image preview area may include:
a. determining an initial position of the scaled portrait area in the corresponding image preview area;

In a specific implementation, when the scaled portrait area is displayed in the image preview area, the picture proportion is appropriate, and the whole image preview area will not be occupied fully. Therefore, it is necessary to determine the initial position of the scaled portrait area in the image preview area.

Specifically, determining the initial position of the scaled portrait area in the corresponding image preview area may include:

a1. detecting a first face key point in a current video frame image of a video;

a2. determining the initial position based on the detected position of the first face key point in the current video frame image;

a3. if the first face key point is not detected, detecting a second face key point in a previous video frame image of the current video frame image;

a4. determining the initial position based on the position of the second face key point in the previous video frame image;

a5. if the first face key point or the second face key point is not detected, taking a preset position as the initial position.

Figure 8:
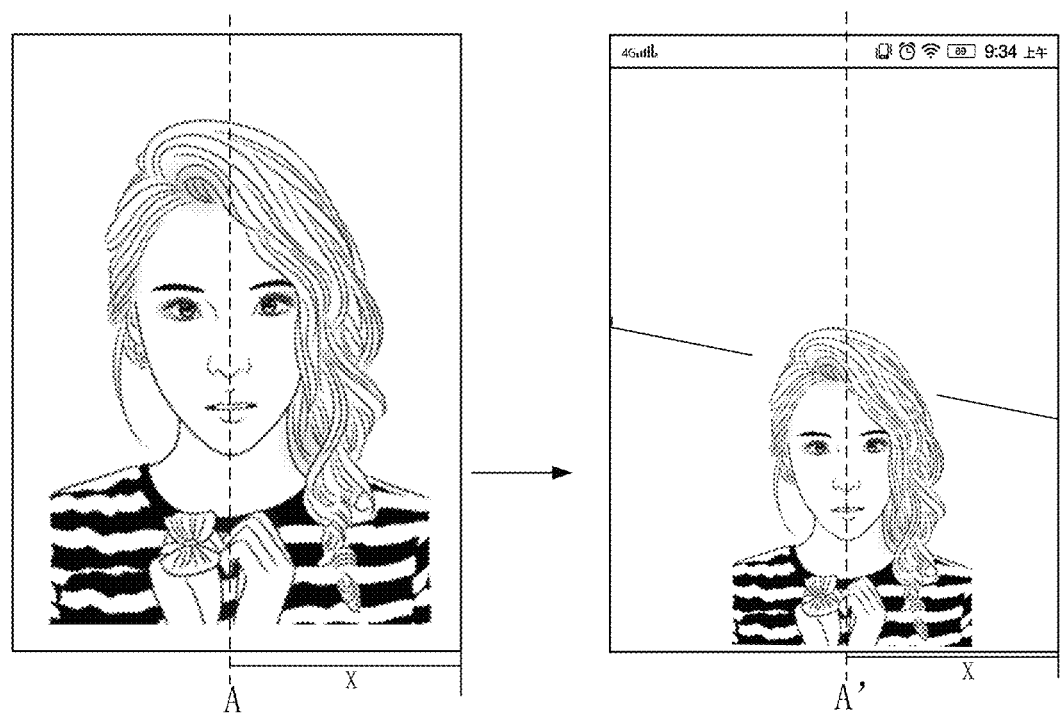
FIG. 8 is a schematic diagram of a solution for determining an initial position provided in an example of the present disclosure.

Specifically, the second face key point and the first face key point are key points of the face image at the same position in different video frame images. For the first face key point or the second face key point, a reference position can be selected from the first face key point or the second face key point, as shown in FIG. 8, for example, the position A of nose in the first face key point or the second face key point is selected, the distance x between the position A and any edge of the video frame image is determined, and after scaling the portrait area, the position A' of nose in the scaled portrait and the corresponding edge of the corresponding image preview area is kept, so that the initial position of the scaled portrait area in the corresponding image preview area can be determined.

Specifically, if the first face key point in the current video frame image is detected, the initial position is determined based on the first face key point; if the first face key point is not detected, the initial position is determined based on the second face key point in the previous video frame image; the initial position can also be determined based on the face key points in the previous preset number of frames; if the first face key point or the second face key point cannot be detected, the preset position, i.e. the default position, can be used as the initial position, or the initial position can be set by the user himself.

Although the above description takes face key points as an example, it can be understood by those skilled in the art that for freeze-framed displaying other parts of portrait, the initial position can also be determined based on the detected positions of key points of other parts of portrait in the current video frame image, and the present disclosure is not so limited.

In addition, when the number of target objects contained in the video displayed in the image preview area is multiple, the face key point of each target object can be collected, and the initial positions of portrait areas corresponding to multiple target objects in the image preview area can be determined according to the above method. The specific determination method is similar to that as described above, and will not be repeated here for brevity.

b. displaying the scaled portrait area in the corresponding image preview area based on the initial position.

Specifically, after the initial position of the portrait area in the current video frame image is determined, if it is detected that the position of the target object changes, the position of the scaled portrait area in the corresponding image preview area is adjusted based on the changed position.

Specifically, if it is detected that the position of the target object changes, the position of the scaled portrait area can be adjusted according to the change distance of the position of the target object; it is also possible to re-detect the first face key point for the next video frame image, and then determine the initial position of the portrait area in the corresponding image preview area according to the re-detected position of the first face key point in the next video frame image, so as to adjust the position of the scaled portrait area.

In addition, if the position of the target object changes, a corresponding first scaling ratio can remain unchanged or change with the picture proportion of the target object in the image preview area, that is, the first scaling ratio can change according to the changed position of the target object. When the position of the target object changes, the background image of the image preview area corresponding to the target object can remain unchanged.

In the above embodiment, if the user takes a selfie, because the shooting distance is too short, the portrait will be taken as the foreground whose scene occupies a relatively large proportion, while the background scene will occupy a too small proportion; if the user doesn't take a selfie, the shooting distance may be inappropriate, which may cause the proportion between the portrait area and the background scene may be disharmonious. No matter whether the user takes a selfie or not, the portrait area in each video frame image in the video can be scaled in real time, and the photos that meet the aesthetic requirements can be obtained.

The above embodiments have explained various ways of displaying the video including the target objects in the image preview areas, and a process of how to freeze-framed display the target object will be explained below with reference to the drawings and embodiments.

An embodiment of the present disclosure provides a possible implementation, in which the freeze-framed displaying the target object in a corresponding image preview area according to a trigger instruction in step S102 may include:

(1) according to the trigger instruction, displaying dynamic timing information;

(2) after a predetermined time period has passed, the display of dynamic timing information is eliminated, and the target object in the current video frame image of the video is freeze-framed displayed in the corresponding image preview area.

Figure 9:
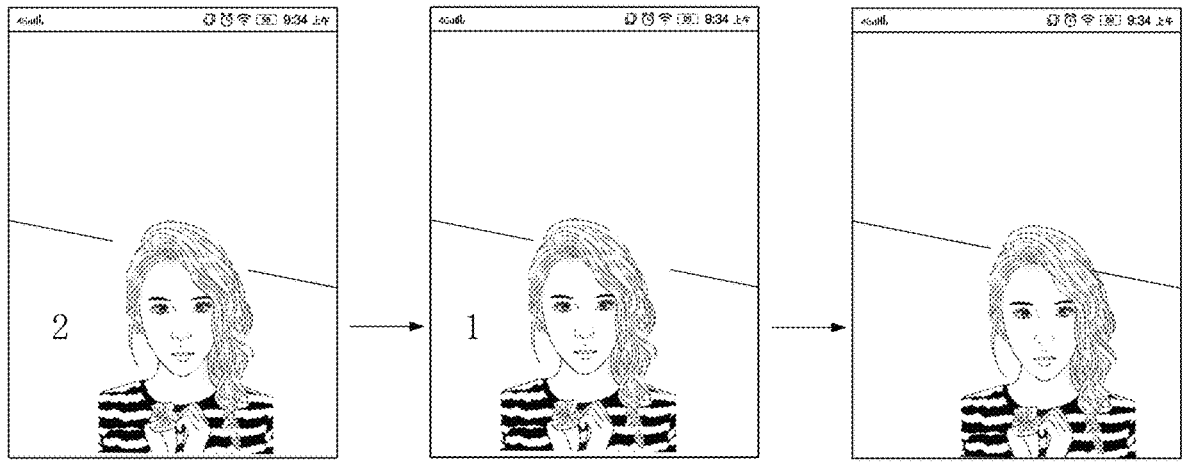
FIG. 9 is a schematic diagram of interactive interface change provided in an example of the present disclosure.

Specifically, the dynamic timing information can be used to notify the time of freeze-framed displaying the video frame image, and it can be in the form of countdown or direct timing, as shown in FIG. 9. For example, the countdown is 2 seconds, and the trigger instruction is voice indication trigger. If the trigger instruction is detected, the dynamic timing information will be displayed in the image preview area for 2 seconds, and after 1 second, the dynamic timing information will be change to 1 second. After 2 seconds, the target object in the current video frame image after 2 seconds will be freeze-framed displayed, and the timing information is eliminated from the interactive interface. Only one example of dynamic timing information is shown in FIG. 9, and the dynamic timing information may also include other forms such as a progress bar, which is not limited in detail.

In other embodiments, a trigger instruction can also be detected, so that the target object in the current video frame image of the video is freeze-framed displayed in the corresponding image preview area.

Hereinafter, the above target object display method will be explained with specific examples more clearly.

Figure 10:
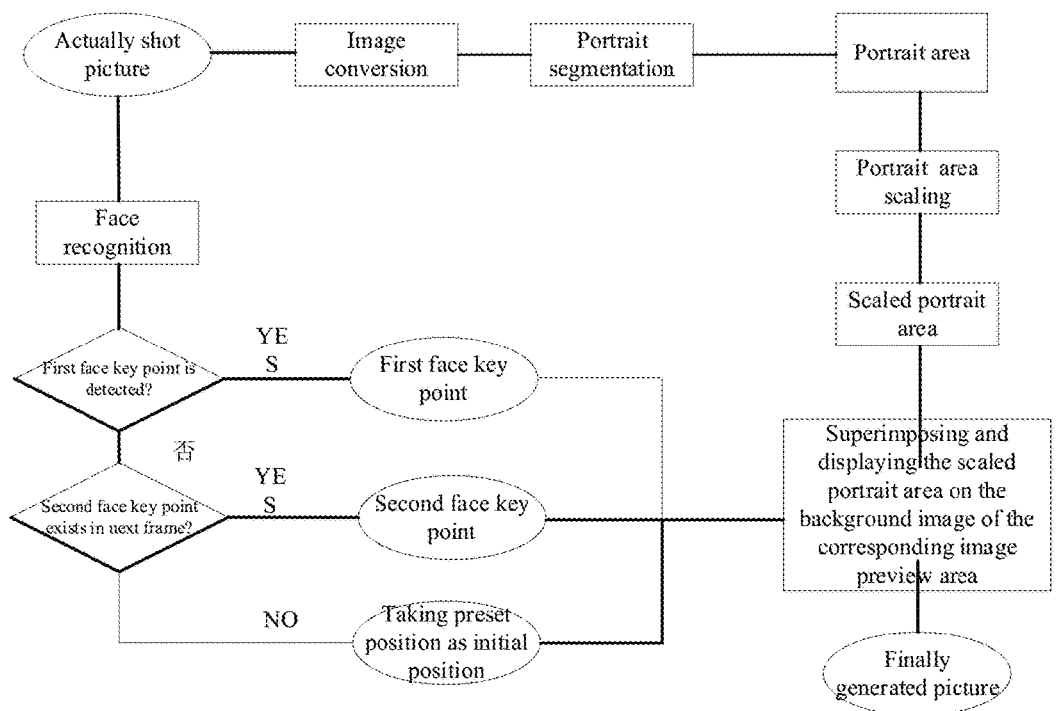
FIG. 10 is a schematic flowchart of a target object display method according to an example of the present disclosure.

As shown in FIG. 10, in one example, the target object display method of the present disclosure may include the following steps:
1) displaying at least two image preview areas on an interactive interface;
2) For each image preview area in turn, perform the following operations:
a) performing image conversion on each video frame image in the video to obtain a converted video frame image;
b) performing portrait segmentation on the converted video frame image, and extracting a portrait area in the converted video frame image;
c) scaling the portrait area in each video frame image in the video based on a first scaling ratio;
d) displaying the scaled portrait area in the corresponding image preview area;
e) detecting a first face key point in the current video frame image of the video;
f) if the first face key point is detected, determining the position of the scaled portrait area in the image preview area according to the face key point;
g) if the first face key point is not detected, detecting a second face key point in the previous video frame image of the current video frame image;
h) determining an initial position based on the position of the second face key point in the previous video frame image;
i) if the first face key point or the second face key point is not detected, taking a preset position as the initial position;
j) freeze-framed displaying the target object in the corresponding image preview area according to the trigger instruction to generate a final image, wherein the final image can include a picture or a shot video.

According to the target object display method as described above, by arranging at least two image preview areas on an interactive interface, displaying a video including the target object and freeze-framed displaying the target object in each image preview area in turn, the well-arranged continuously shot images can be presented without needing the user to change his/her actions or expressions greatly, which can improve the user's photographing experience.

Furthermore, for a video frame image, the image conversion is first performed and then the portrait segmentation is performed, a portrait area is extracted and displayed in a corresponding image preview area, so that the edge lines of the portrait area after image conversion are smoother, which can make the portrait segmentation more detailed and natural; and the image conversion can make the obtained portrait areas have different styles, which are interesting and can improve the user's experience Furthermore, during the background image of the image preview area is switched, while the style of the background image can be switched, the image conversion style of the portrait area can also be changed accordingly, so that the image style of the portrait area is compatible with the style of the background area, and the finally presented picture is more harmonious.

Furthermore, if the user takes a selfie, because the shooting distance is too short, the portrait will be taken as the foreground whose scene occupies a relatively large proportion, while the background scene will occupy a too small proportion; if the user doesn't take a selfie, the shooting distance may be inappropriate, which may cause the proportion between the portrait area and the background scene may be disharmonious. No matter whether the user takes a selfie or not, the portrait area in each video frame image in the video can be scaled in real time, and the photos that meet the aesthetic requirements can be obtained.

Figure 11:
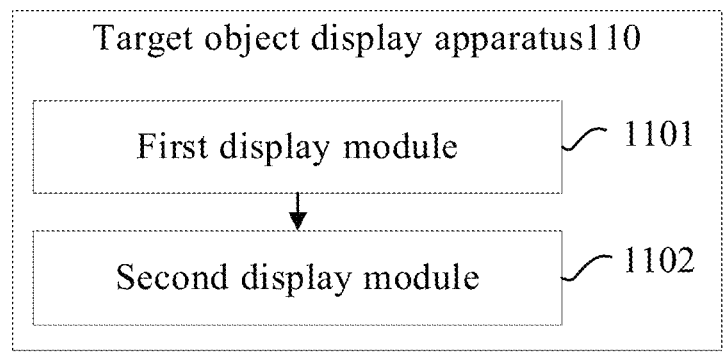
FIG. 11 is a schematic structural diagram of a target object displaying apparatus according to an embodiment of the present disclosure.

An embodiment of the present disclosure provides a target object display apparatus 110, as shown in FIG. 11, the target object display apparatus 110 may include a first display module 1101 and a second display module 1102, wherein, the first display module 1101 for displaying at least two image preview areas; the second display module 1102 for, for each image preview area in turn, performing the following: displaying a video including a target object in a corresponding image preview area, and freeze-framed displaying the target object in the corresponding image preview area according to a trigger instruction.

An embodiment of the present disclosure provides a possible implementation, in which the target object includes a portrait;

The second display module 1102, in displaying a video including a target object in a corresponding image preview area, is specifically for:
for the corresponding image preview area, for each video frame image in the video, performing portrait segmentation on the video frame image, so as to extract a portrait area in the video frame image;
displaying the portrait area in each video frame image in the video in the corresponding image preview area.

An embodiment of the present disclosure provides a possible implementation, in which the second display module 1102 further includes a conversion unit, which is used for:
performing image conversion on a video frame image to obtain a converted video frame image;
the performing portrait segmentation on the video frame image, so as to extract a portrait area in the video frame image comprises:
performing portrait segmentation on the converted video frame image, and extracting a portrait area in the converted video frame image.

An embodiment of the present disclosure provides a possible implementation, in which at least one of at least two image preview areas is provided with a corresponding background image;
the second display module 1102, in displaying a video including a target object in a corresponding image preview area, is specifically used for:
superimposing and displaying the portrait area in each video frame image in the video on the background image of the corresponding image preview area.

An embodiment of the present disclosure provides a possible implementation, in which the target object display apparatus 110 further includes an updating module, which is used for:
upon detecting a background switching operation by a user for at least one image preview area, switching background images of at least one image preview area;
updating and displaying at least two image preview areas, in accordance with the switched background images.

An embodiment of the present disclosure provides a possible implementation, in which the second display module 1102, in displaying the portrait area in each video frame image in the corresponding image preview area, is specifically used for:
scaling the portrait area in each video frame image in the video based on the first scaling ratio;
displaying the scaled portrait area in the corresponding image preview area.

An embodiment of the present disclosure provides a possible implementation, in which the second display module 1102 further includes a scaling unit, used for:
- determining the range area of the portrait area;
- determining the area size of the corresponding image preview area;
- determining the first scaling ratio based on the area size and the range area.

An embodiment of the present disclosure provides a possible implementation, in which the second display module 1102, in displaying the scaled portrait area in the corresponding image preview area, is specifically used for:
- determining an initial position of the scaled portrait area in the corresponding image preview area;
- displaying the scaled portrait area in the corresponding image preview area based on the initial position.

An embodiment of the present disclosure provides a possible implementation, in which the second display module 1102, in determining the initial position of the scaled portrait area in the corresponding image preview area, is specifically used to:
- detecting a first face key point in a current video frame image of a video;
- determining the initial position based on the detected position of the first face key point in the current video frame image.

An embodiment of the present disclosure provides a possible implementation, in which the second display module 1102 further comprises a first detection unit, which is used for:
- if the first face key point is not detected, detecting a second face key point in the previous video frame image of the current video frame image;
- determining the initial position based on the position of the second face key point in the previous video frame image.

An embodiment of the present disclosure provides a possible implementation, in which the second display module 1102 further includes a second detection unit, which is used for:
- if it is detected that the position of the target object changes, adjusting the position of the scaled portrait area in the corresponding image preview area based on the changed position.

An embodiment of the present disclosure provides a possible implementation, in which the second display module 1102, in displaying the target object in the corresponding image preview area according to the trigger instruction, is specifically used for:
- displaying dynamic timing information according to the trigger instruction;
- after a predetermined time period has passed, eliminating the display of dynamic timing information, and freeze-framed displaying the target object in the current video frame image of the video in the corresponding image preview area.

According to the target object display apparatus as described above, by arranging at least two image preview areas on an interactive interface, displaying a video including the target object and freeze-framed displaying the target object in each image preview area in turn, the well-arranged continuously shot photos can be presented without needing the user to change his/her actions or expressions greatly, which can improve the user's photographing experience.

Furthermore, for a video frame image, the image conversion is first performed and then the portrait segmentation is performed, a portrait area is extracted and displayed in a corresponding image preview area, so that the edge lines of the portrait area after image conversion are smoother, which can make the portrait segmentation more detailed and natural; and the image conversion can make the obtained portrait areas have different styles, which are interesting and can improve the user's experience Furthermore, during the background image of the image preview area is switched, while the style of the background image can be switched, the image conversion style of the portrait area can also be changed accordingly, so that the image style of the portrait area is compatible with the style of the background area, and the finally presented picture is more harmonious.

Furthermore, if the user takes a selfie, because the shooting distance is too short, the portrait will be taken as the foreground whose scene occupies a relatively large proportion, while the background scene will occupy a too small proportion; if the user doesn't take a selfie, the shooting distance may be inappropriate, which may cause the proportion between the portrait area and the background scene may be disharmonious. No matter whether the user takes a selfie or not, the portrait area in each video frame image in the video can be scaled in real time, and the photos that meet the aesthetic requirements can be obtained.

The target object display apparatus according to embodiments of the present disclosure can execute a target object display method according to embodiments of the present disclosure, with similar implementation principles. The actions performed by each module of the target object display device in each embodiment of the present disclosure correspond to the steps in the target object display method in each embodiment of the present disclosure, and the detailed functional description of each module of the target object display device can refer to the description of the corresponding target object display method as described above, and will not be repeated here.

Figure 12:
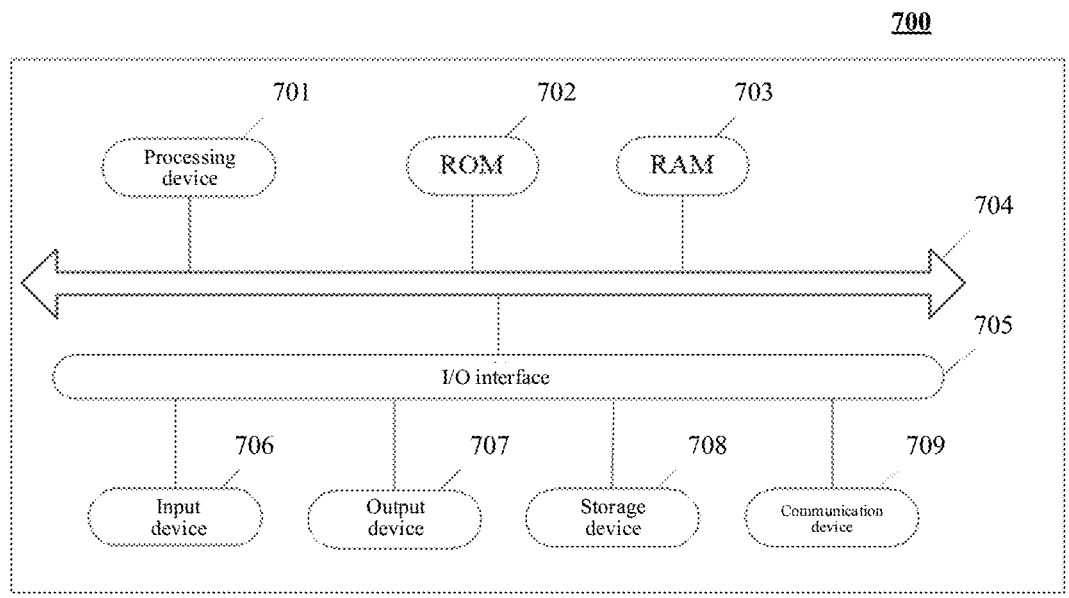
FIG. 12 is a structural schematic diagram of an electronic device for target object displaying according to an embodiment of the present disclosure.

Next, referring to FIG. 12, there is illustrated a schematic structural diagram of an electronic device 700 applicable to the embodiments of the present disclosure. The electronic devices in the embodiments of the present disclosure may include, but not limited to, mobile terminals such as mobile phones, notebook computers, digital broadcast receivers, PDAs (personal digital assistants), PAD (tablet computers), PMP (portable multimedia players), vehicle-mounted terminals (for example, vehicle-mounted navigation terminals), wearable devices with display screens, and fixed terminals such as digital TVs, desktop computers, and the like. The electronic device shown in FIG. 12 is only an example, and should not impose any restriction on the functions and application scopes of the embodiments of the present disclosure.

The electronic device includes a memory and a processor, wherein the processor here can be referred to as the processing device 701 below, and the memory can include at least one of a read-only memory (ROM) 702, a random access memory (RAM) 703 and a storage device 708 below, specifically as follows:

As shown in FIG. 12, the electronic device 700 can include a processing apparatus (such as a central processing unit, a graphics processor, etc.) 701, which can perform various appropriate actions and processes according to a program stored in a Read Only Memory (ROM) 702 or a program loaded into a Random Access Memory (RAM) 703 from a storage device 708. In the RAM 703, various programs and data required for the operation of the electronic device 700 are also stored. The processing device 701, ROM 702 and RAM 703 are connected to each other through a bus 704. An input/output (I/O) interface 705 is also connected to the bus 704.

Generally, the following devices can be connected to the I/O interface 705: an input device 706 including, for example, touch screen, touch pad, keyboard, mouse, camera, microphone, accelerometer, gyroscope, etc.; an output device 707 such as Liquid Crystal Display (LCD), speakers, vibrators, etc.; a storage device 708 including a magnetic tape, a hard disk, etc.; and a communication device 709. The communication device 709 may allow the electronic device 700 to communicate with other devices wirelessly or in wired so as to exchange data. Although FIG. 12 shows an electronic device 700 with various devices, it should be understood that it is not required to implement or have all the devices shown. More or fewer devices may alternatively be implemented or provided.

Particularly, according to embodiments of the present disclosure, the process described above with reference to the flowchart can be implemented as a computer software program. For example, an embodiment of the present disclosure includes a computer program product including a computer program carried on a computer readable medium, the computer program containing program code for executing the method shown in the flowchart. In such an embodiment, the computer program can be downloaded and installed from the network through the communication device 709, or installed from the storage device 708 or from the ROM 702. When executed by the processing device 701, the computer program carries out the above-mentioned functions defined in the method of the embodiment of the present disclosure.

It should be noted that the above-mentioned computer-readable medium in this disclosure can be a computer-readable signal medium or a computer-readable storage medium or any combination of the two. The computer-readable storage medium can be, for example, but not limited to, an electrical, magnetic, optical, electromagnetic, infrared, or semiconductor system, device or equipment, or any combination of the above. More specific examples of computer-readable storage media may include, but not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium can be any tangible medium that contains or stores a program that can be used by or in combination with an instruction execution system, device, or equipment. In this disclosure, the computer-readable signal medium may include a data signal propagated in baseband or as a part of a carrier wave, in which computer-readable program code is carried. This propagated data signal can take many forms, including, but not limited to, electromagnetic signals, optical signals, or any suitable combination of the above. The computer-readable signal medium can also be any computer-readable medium other than the computer-readable storage medium, which can send, propagate, or transmit the program for use by or in connection with the instruction execution system, apparatus, or device. The program code contained in the computer-readable medium can be transmitted by any suitable medium, including but not limited to: electric wire, optical cable, RF (radio frequency), etc., or any suitable combination of the above.

In some embodiments, the client and the server can communicate by using any currently known or future developed network protocol such as HTTP (HyperText Transfer Protocol), and can be interconnected with any form or medium of digital data communication (e.g., communication network). Examples of communication networks include a local area network ("LAN"), a wide area network ("WAN"), the Internet (e.g., the Internet) and end-to-end network (e.g., ad hoc end-to-end network), as well as any currently known or future developed networks.

The above-mentioned computer-readable medium may be included in the electronic device; or it can exist alone without being loaded into the electronic device.

The above-mentioned computer-readable medium carries one or more programs, which can carry out the method as described in the above respective embodiments. The one or more programs, when executed by the electronic device, cause the electronic device to execute the following:

displaying at least two image preview areas;

for each image preview area in turn, performing the following: displaying a video including a target object in a corresponding image preview area, and freeze-framed displaying the target object in the corresponding image preview area according to a trigger instruction.

Computer program codes for performing the operations of the present disclosure can be written in one or more programming languages or a combination thereof, including object-oriented programming languages such as Java, Smalltalk, and C++, as well as conventional procedural programming languages such as "C" language or similar programming languages. The program codes can be completely executed on the user's computer, partially executed on the user's computer, executed as an independent software package, partially executed on the user's computer, and partially executed on the remote computer, or completely executed on the remote computer or server. In a case related to remote computers, the remote computers can be connected to the user computers through any kind of networks, including Local Area Network (LAN) or Wide Area Network (WAN), or can be connected to external computers (for example, through the Internet with Internet service providers).

The flowcharts and block diagrams in the drawings illustrate the architecture, functions, and operations of possible embodiments of systems, methods, and computer program products according to various embodiments of the present disclosure. In this regard, each block in the flowchart or block diagram may represent a module, a program segment, or a part of the code, which contains one or more executable instructions for implementing specified logical functions. It should also be noted that in some alternative implementations, the functions labeled in the blocks may also occur in a different order than those labeled in the drawings. For example, two blocks shown in succession can actually be executed substantially in parallel, and sometimes they can be executed in the reverse order, depending on the functions involved. It should also be noted that each block in the block diagram and/or flowchart, and the combination of blocks in the block diagram and/or flowchart, can be realized by a dedicated hardware-based system that performs specified functions or operations, or can be realized by a combination of dedicated hardware and computer instructions.

The modules described in the embodiments of this disclosure can be realized by software or hardware. In some cases, the name of the module does not limit the module itself. For example, the first acquisition module can also be described as "a module that acquires at least two Internet protocol addresses".

The functions described above herein can be at least partially performed by one or more hardware logic components. For example, without limitation, exemplary types of hardware logic components that can be used include: field programmable gate array (FPGA), application specific integrated circuit (ASIC), application specific standard product (ASSP), system on chip (SOC), complex programmable logic device (CPLD) and so on.

In the context of the present disclosure, a machine-readable medium can be a tangible medium that can contain or store a program for use by or in connection with an instruction execution system, apparatus, or device. The machine-readable medium can be a machine-readable signal medium or a machine-readable storage medium. The machine-readable medium may include, but not limited to, electronic, magnetic, optical, electromagnetic, infrared, or semiconductor systems, devices or equipment, or any suitable combination of the foregoing. More specific examples of machine-readable storage medium may include electrical connections based on one or more wires, portable computer disks, hard disks, random access memories (RAM), read-only memories (ROM), erasable programmable read-only memories (EPROM or flash memories), optical fibers, compact disk read-only memories (CD-ROMs), optical storage devices, magnetic storage devices, or any suitable combination of the above.

According to one or more embodiments of the present disclosure, there is provided a target object display method, comprising:
  displaying at least two image preview areas;
  for each image preview area in turn, performing the following: displaying a video including a target object in a corresponding image preview area, and freeze-framed displaying the target object in the corresponding image preview area according to a trigger instruction.

According to one or more embodiments of the present disclosure, the target object includes a portrait;
  the displaying a video including a target object in a corresponding image preview area comprises:
  for the corresponding image preview area, for each video frame image in the video, performing portrait segmentation on the video frame image, so as to extract a portrait area in the video frame image;
  displaying the portrait area in each video frame image in the video in the corresponding image preview area.

According to one or more embodiments of the present disclosure, before performing portrait segmentation on the video frame image, further comprises:
  performing image conversion on a video frame image to obtain a converted video frame image;
  the performing portrait segmentation on the video frame image, so as to extract a portrait area in the video frame image comprises:
  performing portrait segmentation on the converted video frame image, and extracting a portrait area in the converted video frame image.

According to one or more embodiments of the present disclosure, at least one of at least two image preview areas is provided with a corresponding background image;
  the displaying a video including a target object in a corresponding image preview area comprises:
  superimposing and displaying the portrait area in each video frame image in the video on the background image of the corresponding image preview area.

According to one or more embodiments of the present disclosure, further comprises:
  upon detecting a background switching operation by a user for at least one image preview area, switching background images of at least one image preview area;
  updating and displaying at least two image preview areas, in accordance with the switched background images.

According to one or more embodiments of the present disclosure, the displaying the portrait area in each video frame image in the corresponding image preview area comprises:
  scaling the portrait area in each video frame image in the video based on the first scaling ratio;
  displaying the scaled portrait area in the corresponding image preview area.

According to one or more embodiments of the present disclosure, before scaling the portrait area in each video frame image in the video based on the first scaling ratio, further comprises:
  determining the range area of the portrait area;
  determining the area size of the corresponding image preview area;
  determining the first scaling ratio based on the area size and the range area.

According to one or more embodiments of the present disclosure, the displaying the scaled portrait area in the corresponding image preview area comprises:
  determining an initial position of the scaled portrait area in the corresponding image preview area;
  displaying the scaled portrait area in the corresponding image preview area based on the initial position.

According to one or more embodiments of the present disclosure, the determining the initial position of the scaled portrait area in the corresponding image preview area comprises:
  detecting a first face key point in a current video frame image of a video;
  determining the initial position based on the detected position of the first face key point in the current video frame image.

According to one or more embodiments of the present disclosure, further comprises:
  if the first face key point is not detected, detecting a second face key point in the previous video frame image of the current video frame image;
  determining the initial position based on the position of the second face key point in the previous video frame image.

According to one or more embodiments of the present disclosure, further comprises:
  if it is detected that the position of the target object changes, adjusting the position of the scaled portrait area in the corresponding image preview area based on the changed position.

According to one or more embodiments of the present disclosure, the displaying the target object in the corresponding image preview area according to the trigger instruction comprises:
  displaying dynamic timing information according to the trigger instruction;
  after a predetermined time period has passed, eliminating the display of dynamic timing information, and freeze-framed displaying the target object in the current video frame image of the video in the corresponding image preview area.

The above description is only the preferred embodiment of the present disclosure and the explanation of the applied technical principles. Those skilled in the art should understand that the disclosure scope involved in this disclosure is not limited to the technical solution formed by the specific combination of the above technical features, but also covers other technical solutions formed by any combination of the above technical features or their equivalent features without departing from the above disclosed concept. For example, the above features can be mutually replaced with the technical features with similar functions disclosed in this disclosure (but not limited to).

Furthermore, although the operations are depicted in a particular order, this should not be understood as requiring these operations to be performed in the particular order shown or in sequential order. Under certain circumstances, multitasking and parallel processing may be beneficial. Similarly, although the above discussion contains a number of specific implementation details, these should not be interpreted as limitations on the scope of the present disclosure. Some features described in the context of separate embodiments can also be implemented in a single embodiment in combination. On the contrary, various features described in the context of a single embodiment can also be implemented in multiple embodiments individually or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only exemplary forms of implementing the claims.

What is claimed is:

1. A target object display method, comprising:
   displaying at least two image preview areas;
   for each image preview area, displaying a video including a target object in a corresponding image preview area, and freeze-framed displaying the target object in the corresponding image preview area according to a trigger instruction, wherein displaying the target object in the corresponding image preview area according to the trigger instruction comprises:
   displaying dynamic timing information according to the trigger instruction; and
   in response to determining that a predetermined time period has passed, eliminating display of the dynamic timing information, and freeze-framed displaying the target object in a current frame of the video in the corresponding image preview area.

2. The target object display method of claim 1, wherein the target object includes a portrait; and
   wherein the target object display method further comprises:
   for the corresponding image preview area, for each video frame image in the video, performing portrait segmentation on the video frame image, so as to extract a portrait area in the video frame image; and
   displaying the portrait area in each video frame image in the video in the corresponding image preview area.

3. The target object display method of claim 2, further comprises:
   before performing portrait segmentation on the video frame image, performing image conversion on a video frame image to obtain a converted video frame image; and
   performing portrait segmentation on the converted video frame image, and extracting a portrait area in the converted video frame image.

4. The target object display method of claim 2, wherein at least one of at least two image preview areas is provided with a corresponding background image; and
   the target object display method further comprises:
   superimposing and displaying the portrait area in each video frame image in the video on the background image of the corresponding image preview area.

5. The target object display method of claim 4, further comprises:
   upon detecting a background switching operation by a user for at least one image preview area, switching background images of at least one image preview area;
   updating and displaying at least two image preview areas, in accordance with the switched background images.

6. The target object display method of claim 2, wherein the displaying the portrait area in each video frame image in the corresponding image preview area comprises:
   scaling the portrait area in each video frame image in the video based on the first scaling ratio;
   displaying the scaled portrait area in the corresponding image preview area.

7. The target object display method of claim 6, further comprising:
   before scaling the portrait area in each video frame image in the video based on the first scaling ratio,
   determining the range area of the portrait area;
   determining the area size of the corresponding image preview area;
   determining the first scaling ratio based on the area size and the range area.

8. The target object display method of claim 6, wherein, the displaying the scaled portrait area in the corresponding image preview area comprises:
   determining an initial position of the scaled portrait area in the corresponding image preview area;
   displaying the scaled portrait area in the corresponding image preview area based on the initial position.

9. The target object display method of claim 8, wherein the determining the initial position of the scaled portrait area in the corresponding image preview area comprises:
   detecting a first face key point in a current video frame image of a video;
   determining the initial position based on the detected position of the first face key point in the current video frame image.

10. The target object display method of claim 9, further comprising:
    in response to determining that the first face key point is not detected, detecting a second face key point in the previous video frame image of the current video frame image;
    determining the initial position based on the position of the second face key point in the previous video frame image.

11. The target object display method of claim 8, further comprising:
    in response to detecting that the position of the target object changes, adjusting the position of the scaled portrait area in the corresponding image preview area based on the changed position.

12. The target object display method of claim 1, wherein the freeze-framed displaying the target object comprises: upon the trigger instruction is detected, displaying a target object in one frame of image to which the trigger instruction points in a corresponding image preview area while remaining unchanged.

13. An electronic device comprising:
one or more processors;
a memory that stores one or more application programs, wherein the one or more application programs, when executed by the one or more processors, cause the electronic device to:
display at least two image preview areas;
for each image preview area in turn, display a video including a target object in a corresponding image preview area, and freeze-framed display the target object in the corresponding image preview area according to a trigger instruction, wherein displaying the target object in the corresponding image preview area according to the trigger instruction comprises:
displaying dynamic timing information according to the trigger instruction; and
in response to determining that a predetermined time period has passed, eliminating display of the dynamic timing information, and freeze-framed displaying the target object in a current frame of the video in the corresponding image preview area.

14. The electronic device of claim 13, wherein the target object includes a portrait; and
wherein the one or more application programs, when executed by the one or more processors, further cause the electronic device to:
for the corresponding image preview area, for each video frame image in the video, perform portrait segmentation on the video frame image, so as to extract a portrait area in the video frame image; and
display the portrait area in each video frame image in the video in the corresponding image preview area.

15. The electronic device of claim 14, wherein the one or more application programs, when executed by the one or more processors, further cause the electronic device to:
before performing portrait segmentation on the video frame image, perform image conversion on a video frame image to obtain a converted video frame image; and
perform portrait segmentation on the converted video frame image, and extract a portrait area in the converted video frame image.

16. The electronic device of claim 13, wherein at least one of at least two image preview areas is provided with a corresponding background image; and
wherein the one or more application programs, when executed by the one or more processors, further cause the electronic device to:
upon detecting a background switching operation by a user for at least one image preview area, switch background images of at least one image preview area;
update and display at least two image preview areas, in accordance with the switched background images.

17. A non-transitory computer readable storage medium on which computer programs are stored, which, when executed by a processor, cause the processor to:
display at least two image preview areas;
for each image preview area in turn, display a video including a target object in a corresponding image preview area, and freeze-framed display the target object in the corresponding image preview area according to a trigger instruction, wherein displaying the target object in the corresponding image preview area according to the trigger instruction comprises:
displaying dynamic timing information according to the trigger instruction; and
in response to determining that a predetermined time period has passed, eliminating display of the dynamic timing information, and freeze-framed displaying the target object in a current frame of the video in the corresponding image preview area.

18. The non-transitory computer readable storage medium of claim 17, wherein the target object includes a portrait; and
wherein the computer programs, when executed by the processor, further cause the processor to:
for the corresponding image preview area, for each video frame image in the video, perform portrait segmentation on the video frame image, so as to extract a portrait area in the video frame image; and
display the portrait area in each video frame image in the video in the corresponding image preview area.

19. The non-transitory computer readable storage medium of claim 17, wherein at least one of at least two image preview areas is provided with a corresponding background image; and
wherein the computer programs, when executed by the processor, further cause the processor to:
upon detecting a background switching operation by a user for at least one image preview area, switch background images of at least one image preview area;
update and display at least two image preview areas, in accordance with the switched background images.

* * * * *